W. HOLMES.
Thrashing Machine.

No. 15,074.

Patented June 10, 1856.

Witnesses

Inventor
William Holmes

UNITED STATES PATENT OFFICE.

WILLIAM HOLMES, OF BROOKLYN, NEW YORK.

THRESHING-MACHINE.

Specification of Letters Patent No. 15,074, dated June 10, 1856.

*To all whom it may concern:*

Be it known that I, WILLIAM HOLMES, of the city of Brooklyn and State of New York, have invented certain new and useful Improvements in the Mode of Constructing Threshing-Machines, of which the following description, illustrated by the accompanying drawings, is sufficiently clear and comprehensive to enable persons of competent skill to make and use my invention.

Figure 1:
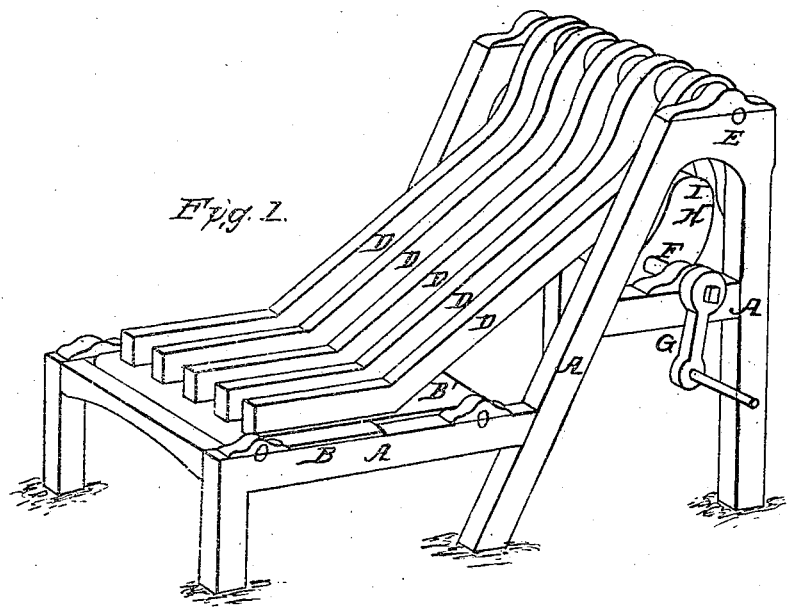
Figure 2:
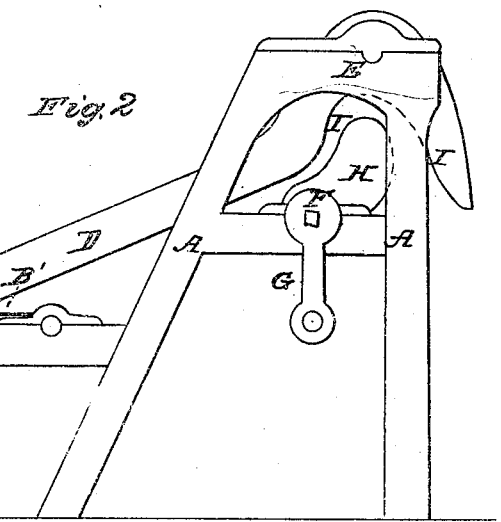

Figure 1, is a perspective view and Fig. 2, is a side elevation.

The nature of my improvement relates to the use of a series of cams in connection with a like series of levers or beaters so arranged that the cams will strike both arms of the levers at each revolution the long arm to raise the lever and the short arm to bring it down with a quick whipping stroke.

A, A, is the frame of the machine; B the bed for threshing, upon which is placed the endless apron B' which may extend quite through the machine and be operated by the shaft C or in any other convenient manner, and D, D, &c. are the beaters bent and curved in the form represented, being all hung loosely upon the shaft E. Upon the shaft F, operated by the crank G, (or a drive pulley in its stead) are a series of cams H corresponding to the number of beaters, each cam being located within the curved part I, I, of the same as shown by the drawings. Upon the revolution of the shaft F, over to the right the cams first strike the curve upon the long arm of the levers and elevate the lever the cam then continues and striking the short arm brings the lever down up the grain with a peculiar whipping stroke—a motion particularly adapted to threshing grain and other like substances. The cams may be set in line with each other so as to bring the levers or beaters D all down at the same time, or may be set upon different sides of the shaft to produce any irregularity of stroke desired. The beating part of the lever may have a variety of forms suited to the kinds of grain to be threshed, and the number of levers may also be extended at pleasure.

What I claim is—

The use of a series of cams H, constructed and arranged as described for the purpose of operating the beating levers D by revolving in the curves I, I, or their equivalent and striking both arms of each of the levers D in rapid succession, giving to the downward motion of the longer arm, or beater a quick whipping stroke, the whole arranged and operating substantially as specified.

WILLIAM HOLMES.

Witnesses:
JOHN B. FAIRBANK,
WM. SINCLAIR.